United States Patent [19]
Bhattacharya

[11] Patent Number: 5,893,635
[45] Date of Patent: Apr. 13, 1999

[54] HEADLAMP WITH ENHANCED LIGHT GATHERING CONDENSER

[75] Inventor: Ram Bhattacharya, Framingham, Mass.

[73] Assignee: Luxtec Corporation, Worcester, Mass.

[21] Appl. No.: 08/808,998

[22] Filed: Mar. 3, 1997

Related U.S. Application Data

[60] Provisional application No. 60/012,790, Mar. 4, 1996.

[51] Int. Cl.$^6$ ............................................. F21V 29/00
[52] U.S. Cl. .................. 362/268; 362/331; 362/105; 362/559; 362/560; 362/572
[58] Field of Search .................. 362/32, 33, 268, 362/331, 105, 106

[56] References Cited

U.S. PATENT DOCUMENTS

| | | | |
|---|---|---|---|
| 3,586,851 | 6/1971 | Rudolph | 362/32 X |
| 4,104,709 | 8/1978 | Kloots | 362/105 |
| 4,530,578 | 7/1985 | Kato | 353/31 |
| 4,576,160 | 3/1986 | Tanaka | 362/32 X |
| 4,621,283 | 11/1986 | Feinbloom | 362/33 X |
| 4,628,416 | 12/1986 | Dewey | 362/32 |
| 4,797,736 | 1/1989 | Kloots et al. | 362/33 X |
| 4,887,190 | 12/1989 | Sadamune et al. | 362/32 |
| 4,918,583 | 4/1990 | Kudo et al. | 362/32 X |
| 5,163,420 | 11/1992 | Van Der Bel | 362/105 |
| 5,634,704 | 6/1997 | Shikama et al. | 353/31 |

*Primary Examiner*—Ira S. Lazarus
*Assistant Examiner*—David Lee
*Attorney, Agent, or Firm*—Weingarten, Schurgin, Gagnebin & Hayes LLP

[57] ABSTRACT

A headlamp module for providing a uniform field of illumination at a predetermined distance includes a headlamp housing having a first end and a second end. A light source such as a terminated fiber optic cable is disposed within the first end of the housing. A condenser system is disposed within said headlamp housing in optical communication with a light source which is positioned close to the condenser. The condenser system, which comprises a pair of planar convex lenses oriented with the convex sides facing each other, is in optical communication with a reflecting element such as a planar mirror or a reflecting prism. The light reflected by the reflecting element is directed to an exit lens, such as a projection lens or an objective. The light exiting the exit lens provides the uniform field of illumination despite the presence of a real image of the light source termination at a distance close to the exit lens. An iris may be used between the condenser and the reflective element to narrow the light reaching the reflective element.

14 Claims, 1 Drawing Sheet

HEADLAMP WITH ENHANCED LIGHT GATHERING CONDENSER

CROSS REFERENCE TO RELATED APPLICATIONS

This application is based on Provisional Application Ser. No. 60/012,790 filed on Mar. 4, 1996.

STATEMENT REGARDING FEDERALLY SPONSORED RESEARCH OR DEVELOPMENT

Not Applicable

BACKGROUND OF THE INVENTION

In a prior art headlamp module, specifically for use by surgeons, a light source was placed relatively far from a condenser system according to conventional projection technology, so as to prevent the formation of a real image external to the module. In this configuration, much of the light emitted by the light source does not enter the condenser system, thereby making the system less efficient with respect to the amount of light emitted by the light source compared to the amount of light exiting the module. This results in a high power requirement in an operation room environment for example, where power may be at a premium. Also, a greater amount of heat must be dissipated and reliability is compromised.

BRIEF SUMMARY OF THE INVENTION

The present invention provides a headlamp module having a light source disposed close to a condenser system which allows a greater amount of light emitted by the light source to be collected by the condenser system. The condenser system collimates the collected light. An iris may be used to limit the amount of collimated light reaching the reflective element. A mirror angled at approximately forty-five degrees with respect to the collimated light or a reflecting prism reflects the light through an exit lens such as a projection lens or an objective. The headlamp module thereby provides a uniform illumination in a field of view at approximately sixteen inches from the projection lens. The condenser includes a pair of planar convex lenses, spaced apart from each other with the convex side of each lens facing each other in order to provide the collimated light.

DETAILED DESCRIPTION OF THE INVENTION

In order to properly describe the present invention it is important to define three terms that are used in this field—focal length, real image and virtual image. The focal length of a converging lens is defined as the distance from the lens to a point that parallel rays are converged to by passing through the lens. A real image is defined as an image formed from a lens or mirror where light actually passes through the point to reproduce the object. A virtual image is defined as an image in which the observed rays do not actually pass, for example a mirror reflection shows an object to be behind the mirror the same distance that the object is in front of the mirror.

Figure 1:
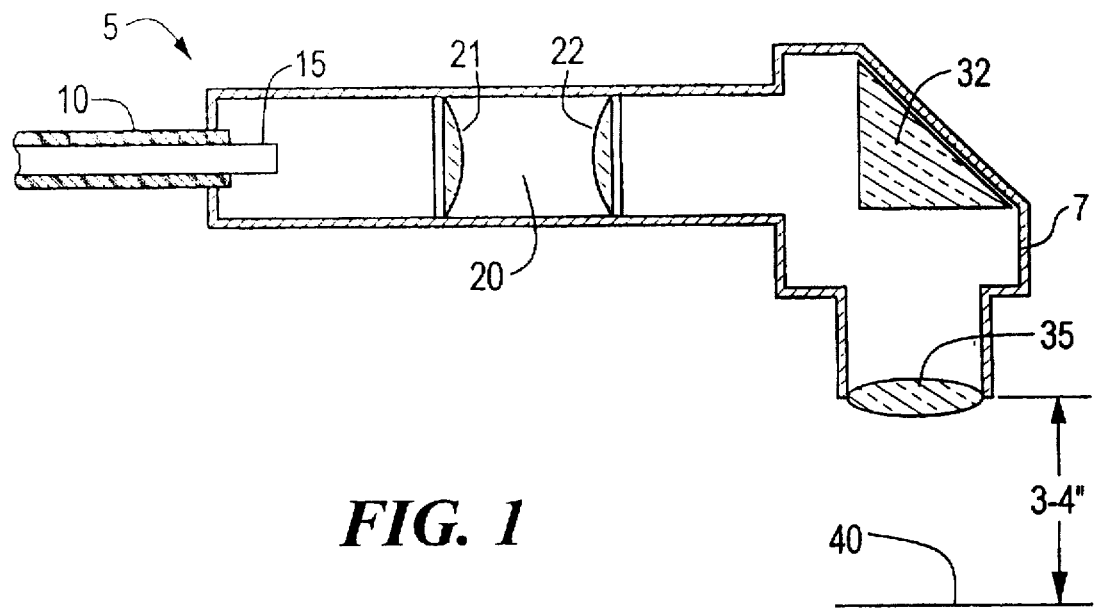
FIG. 1 is a diagram of the headlamp module of the present invention.
Figure 2:
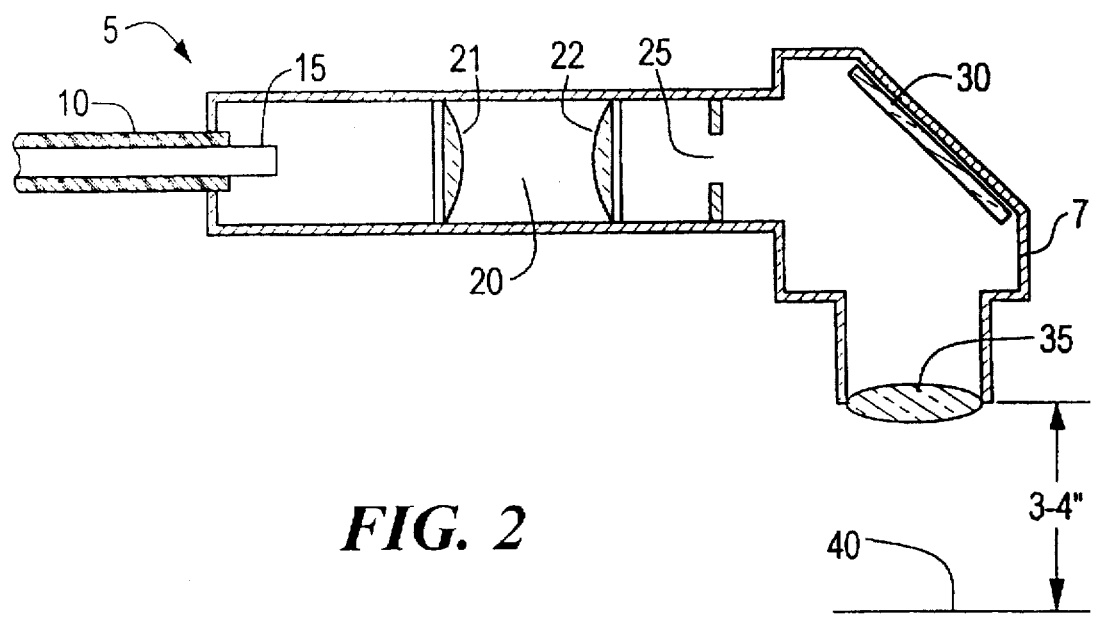
FIG. 2 is an alternate embodiment of the headlamp module.

FIGS. 1 and 2 illustrate exemplary embodiments of a headlamp module 5 according to the present invention. The headlamp module 5 is adapted to be worn by a user, such as a surgeon, and provides a uniform field of illumination at a desired distance from the user.

The headlamp module 5 includes a headlamp housing 7 which has a condenser system 20 and an exit lens in optical communication with the condenser system 20. The headlamp housing 7 has a socket at a first end for receiving a fiber optic cable 10 or other device which provides at its termination a light source 15. In this embodiment, where the light exiting the module 5 is not coplanar with the light provided by light source 15, a reflective element 30 is disposed between the condenser system 20 and the exit lens. The light source 15 is positioned within the housing 7 close to a condenser system 20 as compared to prior devices. In prior devices the light source 15 had to be placed at a distance which was greater than the focal length of the condenser system 20 in order to avoid the formation of a real or virtual image of the light source termination within or external to the headlamp module 5.

In the present invention the light source 15 is positioned relatively close to the condenser system 20, such that a virtual image of the light source termination is formed in the condenser system 20 and a real image 40 of the light source termination is formed external to the headlamp module 5, typically at a distance of three to four inches from a projection lens or an objective 35. The close positioning of the light source 15 with respect to the condenser system 20, allows a greater amount of the light emitted by the light source 15 to be collected by the condenser system 20. The condenser system 20 includes a first planar convex lens 21 and a second planar convex lens 22 wherein the convex sides of the first and second lens face each other. The diameter of the condenser system lenses 21 and 22 is large enough to capture all or most of the light provided by the light source 15. The condenser system 20 collimates or nearly collimates the collected light. Collimation results in the formation of parallel rays of light. The light exiting the condenser system 20 is reflected by a reflecting element 30. The reflecting element 30 may comprise a reflecting prism 32 or a planar mirror. When a planar mirror is used it should be disposed at a forty-five degree angle with respect to the collimated light beam, although other angles are within the scope of the invention. Light reflected by the reflecting element 30 then exits the module through the exit lens 35 and forms a real image 40. In an exemplary embodiment, the real image 40 is formed at approximately three to four inches from the objective 35. The headlamp module provides uniform illumination in a field of view at about 16 inches from the exit lens 35, despite the presence of a real image 40 of the fiber termination at three to four inches from the exit lens 35. However, the real image 40 is not seen by a module user, such as a surgeon, since the normal operating distance for a surgeon is about fourteen to sixteen inches from the exit lens 35. Maximum luminance will occur along an axis which is perpendicular to the optic axis of the exit lens, and luminescence away from the axis will decrease in proportion to the fourth power of the cosine of the angle subtended with the optical axis of the exit lens. In an alternative embodiment, the real image may be formed external to the headlamp module 5 within a focal length of the objective.

In an alternate embodiment, an iris 25 is disposed within the headlamp housing 7 between the condenser system 20 and reflective element 30. The iris 25 reduces the amount of collimated rays reaching reflective element 30.

The present invention provides a brighter and more uniform field of illumination while requiring less power than prior devices. Additionally, the present invention generates less heat, is more efficient, and is more reliable than prior headlamp modules.

Having described preferred embodiments of the invention it will now become apparent to those of ordinary skill in the art that other embodiments may be used. Accordingly, it is submitted that the invention should not be limited to the described embodiment but rather should be limited only by the spirit and scope of the appended claims.

I claim:

1. A headlamp module comprising:

a headlamp housing having a first end and a second end;

a condenser system comprising a first planar convex lens and a second planar convex lens spaced a distant apart, the condenser system disposed within said headlamp housing;

a light source disposed within the first end of said headlamp housing and in direct optical communication with said condenser, said light source spaced a distance away from said condenser system wherein the distance is less than a focal length of said condenser system, and wherein a virtual image of a termination of said light source is formed in the condenser system; and an exit lens in optical communication with said condenser system, disposed at the second end of said headlamp housing.

2. The headlamp module of claim 1 wherein said exit lens is a projection lens.

3. The headlamp module of claim 1 wherein said exit lens is an objective.

4. The headlamp module of claim 1 further comprising a reflective element disposed within said headlamp housing between said condenser system and said exit lens, and in optical communication with said condenser system and said exit lens.

5. The headlamp module of claim 4 further comprising an iris disposed within said headlamp housing between said condenser system and said reflective element.

6. The headlamp module of claim 4 wherein said reflective element is a reflecting prism.

7. The headlamp module of claim 4 wherein said reflective element is a planar mirror.

8. The headlamp module of claim 7 wherein said planar mirror is angled at approximately 45 degrees with respect to a collimated light beam exiting said condenser system.

9. The headlamp module of claim 1 wherein said first and second planar convex lenses are disposed such that a convex surface of the first planar convex lens faces a convex surface of the second planar convex lens.

10. The headlamp module of claim 1 wherein the distance between said first planar convex lens and said second planar convex lens is less than a focal length of said first planar convex lens and less than the focal length of said second planar convex lens.

11. The headlamp module of claim 1 wherein said light source is disposed at a distance from said condenser system wherein a real image is provided at a distance of greater than approximately three inches from said exit lens and less than approximately four inches from said exit lens.

12. The headlamp module of claim 1 wherein said light source is disposed at a distance from said condenser system wherein a real image is provided at a distance approximately equal to a focal length of said exit lens.

13. A headlamp module comprising:

a headlamp housing having a first end and a second end;

a condenser system comprising a first planar convex lens and a second planar convex lens spaced a distance apart, the condenser system disposed within said headlamp housing;

a light source disposed within the first end of said headlamp housing and in direct optical communication with said condenser, said light source spaced a distance away from said condenser system wherein the distance is less than a focal length of said condenser system, and wherein a virtual image of a termination of said light source is formed in the condenser system;

a reflective element in optical communication with said condenser system, disposed within said headlamp housing;

an exit lens in optical communication with said reflecting element, disposed at the second end of said headlamp housing; and wherein a real image is provided between said second end of said headlamp housing and a field of illumination.

14. The headlamp module of claim 13 wherein said real image is provided proximate said second end of said headlamp housing.

* * * * *